United States Patent Office 2,796,937
Patented June 25, 1957

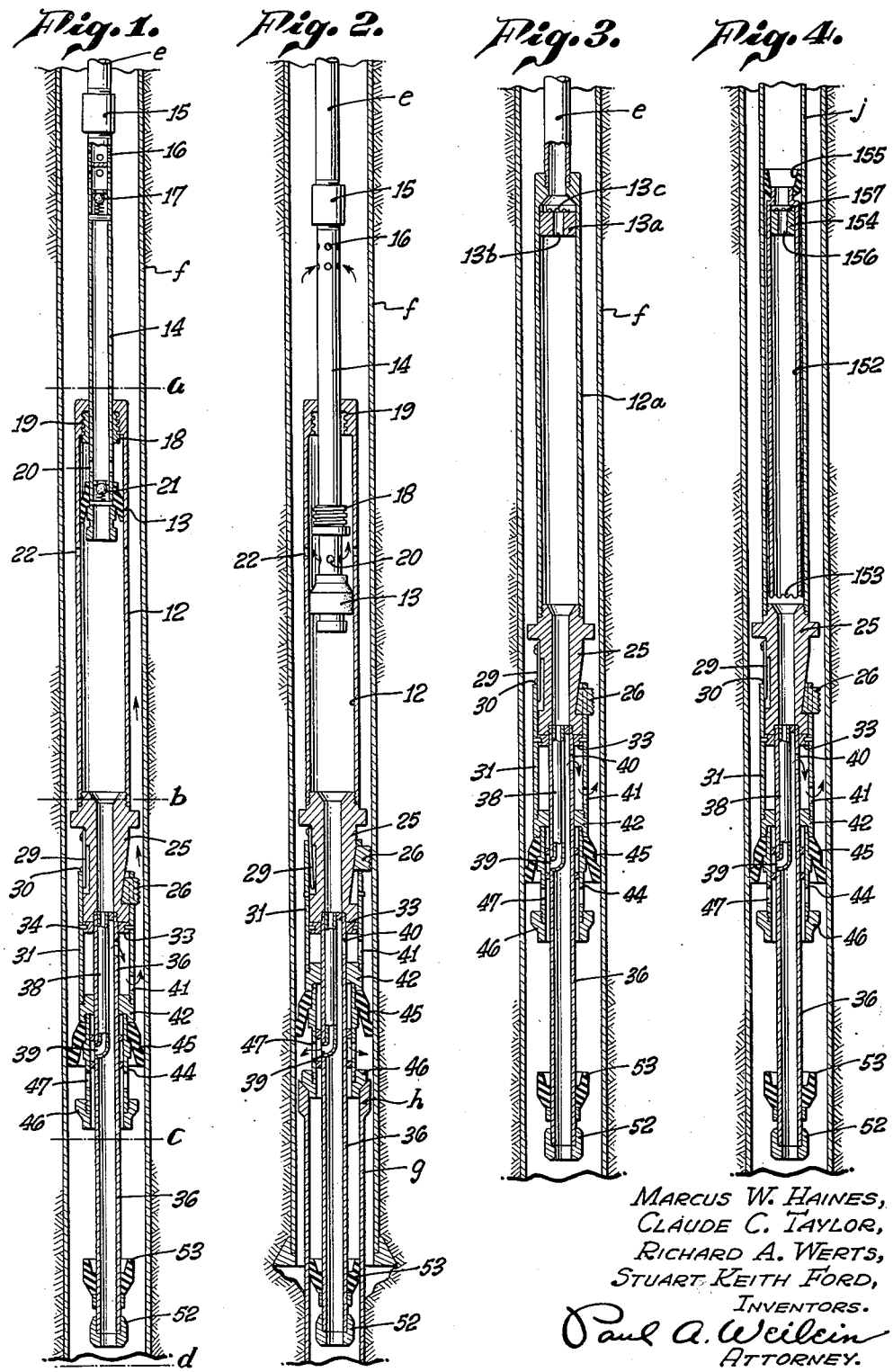

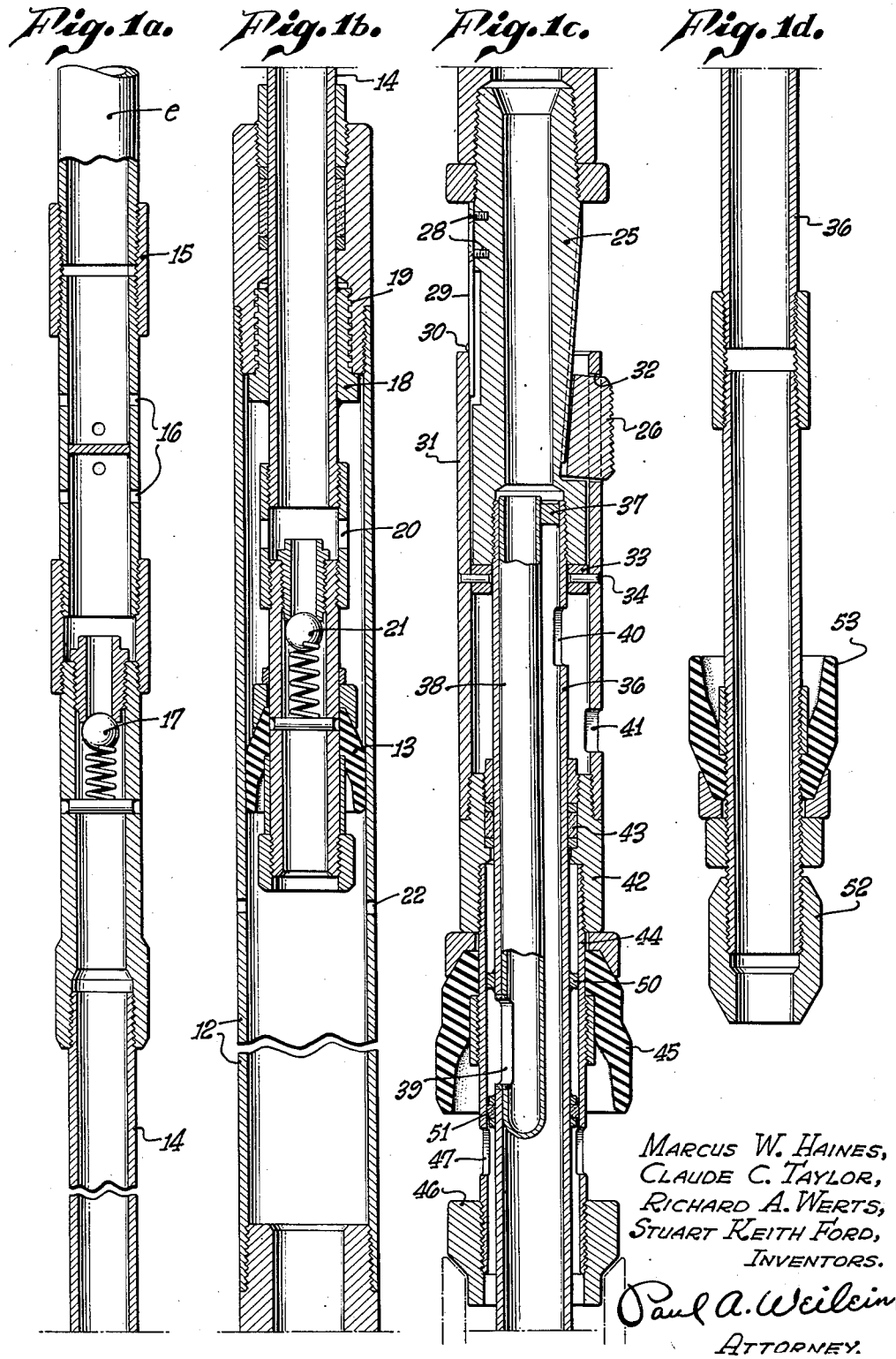

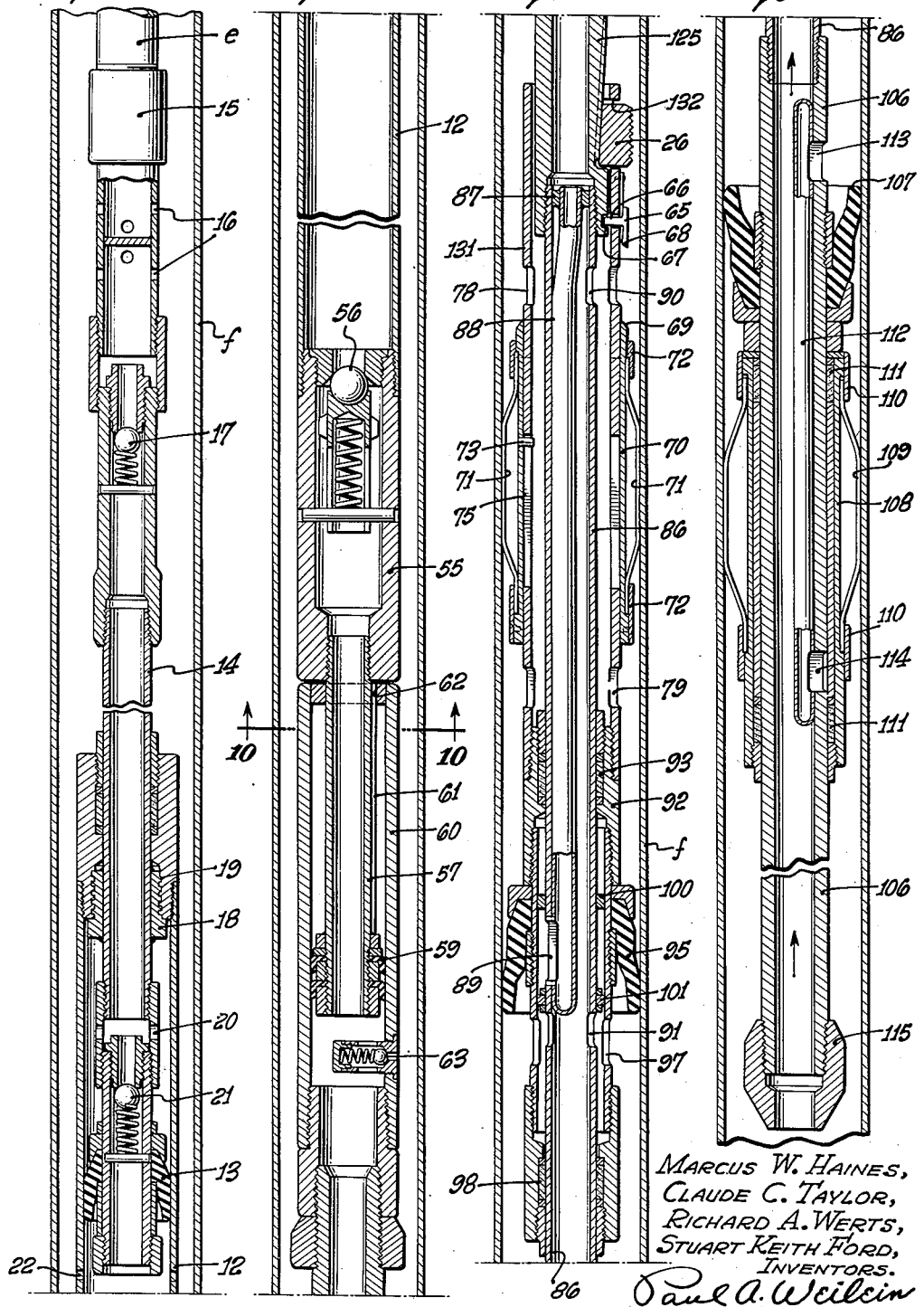

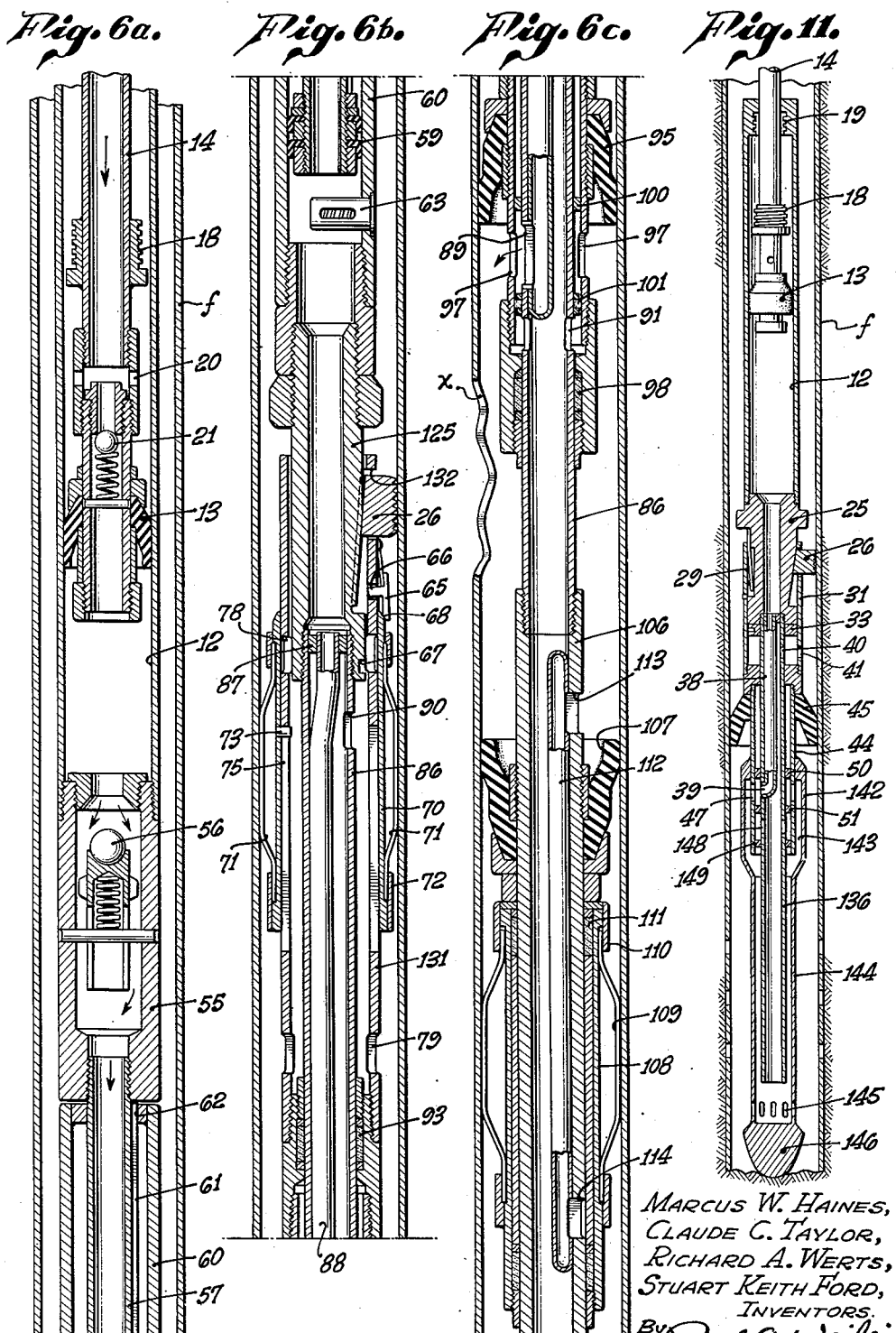

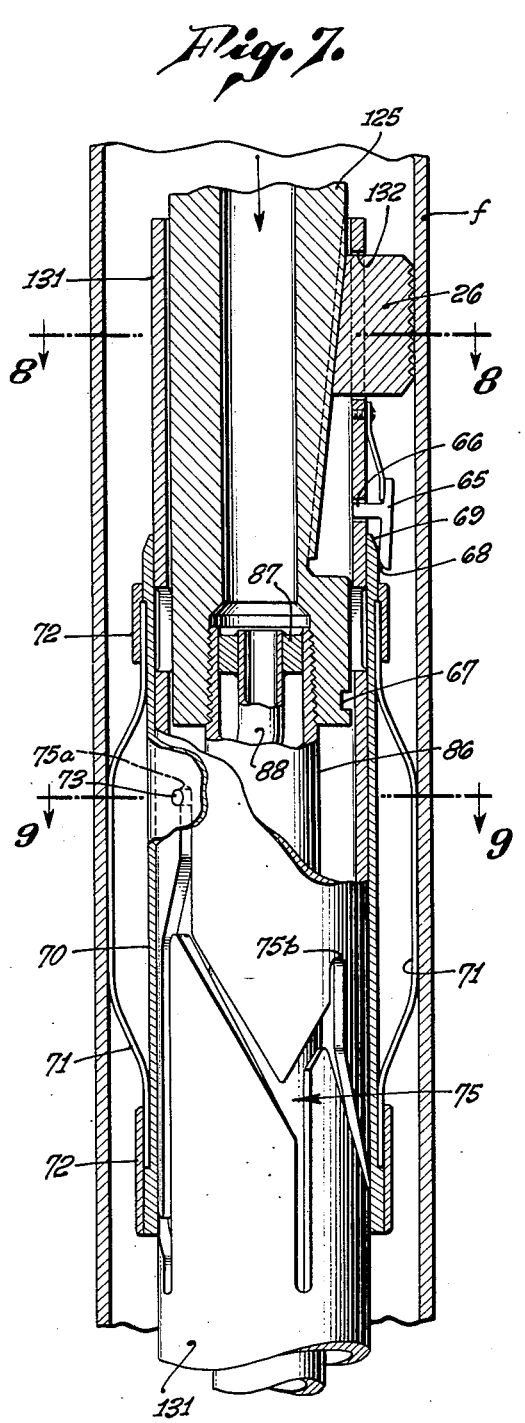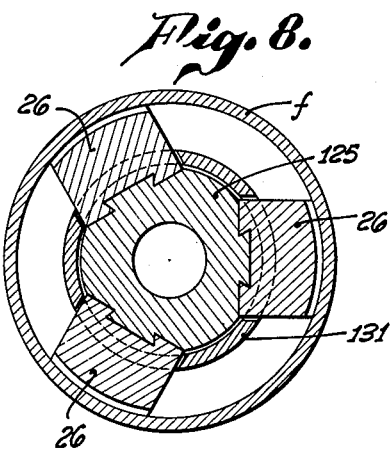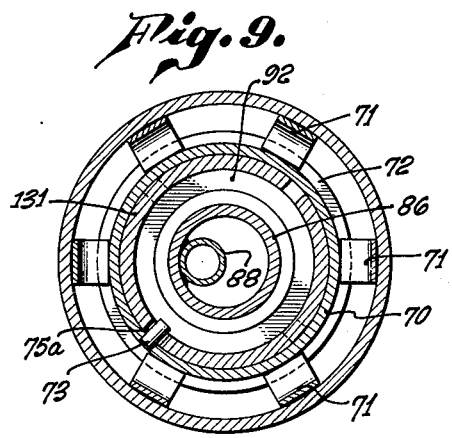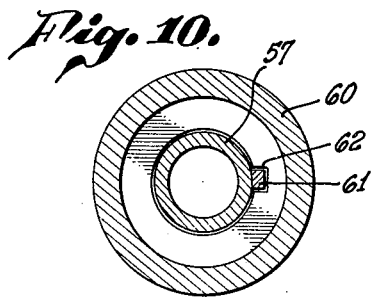

2,796,937

APPARATUS FOR SEALING LEAKS IN WELLS

Marcus W. Haines, Long Beach, Claude C. Taylor, Seal Beach, and Richard A. Werts and Stuart Keith Ford, Long Beach, Calif., assignors to McGaffey-Taylor Corporation, Long Beach, Calif., a corporation of California Application March 9, 1950, Serial No. 148,702

22 Claims. (Cl. 166—147)

This invention relates to the sealing of joints and leaks in water and oil wells.

An object is to provide apparatus for sealing well leaks at any level in a well casing, while avoiding the defects of previous sealing processes.

Another object is to apply with the apparatus thick, viscous, coherent, semi-solid plastic sealing material under any suitable or required pressure to a restricted and isolated zone or section of the well where there is leakage.

Still another object is to provide apparatus particularly adapted for use with thick, coherent, semi-solid sealing materials.

Still another object is to provide apparatus which can be charged with a batch of the sealent material before or after it has been lowered into the well.

Still another object is to provide apparatus which can be readily positioned in a well to accomplish the above purposes and which can be readily changed in position.

Still another object is to provide apparatus which can isolate and test a zone or section of a well for leakage both before and after the application of the sealent material and without withdrawing the apparatus from the well.

Still another object is to provide apparatus from which undischarged sealing material can be flushed and cleaned without withdrawing the apparatus from the well.

Still another object is to provide apparatus charged with sealent material which can be set and reset as many times as necessary to locate and isolate a zone or section of the well where leakage occurs without loss or discharge of any of the sealent during setting and resetting but providing for posititive discharge of sealent when the apparatus is accurately positioned.

Still another object is to provide for visual indication at the surface of the functioning of the apparatus during setting and resetting of the same.

Still another object is to provide apparatus for efficiently sealing leaks at all levels of a well and under adverse working conditions.

Still other objects will be apparent from the detailed description which follows.

The forms of apparatus for applying the semi-solid sealent and for carrying out the sealing process will vary somewhat in structure depending upon whether the leak to be sealed is at the liner lap in the casing, at a straight portion of the casing, or at the bottom. In each instance however the zone of leakage will be isolated and confined to as small dimensions as possible so as to use a minimum quantity of the plastic material in sealing the leak; thus minimizing the danger of shutting off, impairing or otherwise adversely effecting the operation of the well. The charge of sealent is positioned adjacent the isolated zone or section of the well but is maintained out of contact with all well fluids and fully under control from the surface. The sealent is not ejected from its container until the tool is securely set in position in the well casing.

The act of setting the slips or equivalent securing means for the squeeze tool operates a valve to open the discharge port through which the sealent can be ejected into the isolated zone of the well. If the tool is released and is to be reset, the releasing operation automatically closes the valve. When rotation of the tubing string is utilized to unlock the discharge piston for the sealent, setting and resetting of the slips which is effected by vertical movement of the squeeze tool, a visual indication of the operations is given at the surface.

In order to illustrate the invention and the manner of its use concrete embodiments of apparatus for utilizing the improved sealing material and for carrying out the various steps of the sealing process are shown in the accompanying drawings, in which:

Figure 1 is a diagrammatic vertical sectional view, showing some parts in elevation, of a mechanical squeeze tool being lowered into a well to seal a liner hanger lap joint in the well casing;

Figures 1a, 1b, 1c and 1d show the squeeze tool of Figure 1 in section, on an enlarged scale and in greater detail, but divided into four parts by reason of the length of the tool, these figures to be considered as placed one upon the other, each such part ending substantially as the levels marked a, b, c, and d in Figure 1;

Figure 2 is a diagrammatic vertical sectional view on the scale of Figure 1 showing the squeeze tool of Figure 1 in place and the sealing operation in progress, certain parts being shown in elevation;

Figure 3 is a diagrammatic vertical sectional view similar to Figure 1, showing a modification of the squeeze tool utilizing a plastic chamber provided with a free piston;

Figure 4 is a diagrammatic vertical sectional view similar to Figure 3 showing still another modification wherein the plastic chamber takes the form of a cartridge which can be inserted into the tubing supporting the tool before or after the tool is in place;

Figures 5a, 5b, 5c and 5d taken together and one upon the other show in vertical section a modified form of squeeze tool for locating and sealing leaks in straight hole portions of the well casing, the parts of the tool being shown in lowering position;

Figures 6a, 6b, and 6c taken together and one upon the other show in vertical sections the essential parts of the squeeze tool of Figures 5a, 5b, 5c and 5d properly positioned in a well casing and in process of sealing a leak in the wall;

Figure 7 is a detailed enlarged view partly in vertical section and partly in elevation of the rotary slip latch mechanism shown in Figures 5c and 6c, the slips being in casing gripping position as in Figures 6b and 6c;

Figures 8 and 9 are transverse sectional views on the lines 8—8 and 9—9 respectively of Figure 7;

Figure 10 is a detailed transverse sectional view of the squeeze tool only, taken on the line 10—10 of Figure 5b; and Figure 11 is a vertical sectional view of a modification of the squeeze tool for sealing the bottom of a well or the lower end of the casing.

Referring now to the drawing, Figures 1–2 show an injector or squeeze tool embodying the invention and particularly adapted and intended for sealing a liner hanger joint in a well casing. In Figure 1 the tool is being lowered into the well, in Figure 1c the liner stop on the tool is about to engage the inner liner hanger, while in Figure 2 the tool is in place and the sealing operation has begun. The squeeze tool is shown in Figures 1, 1a and 2 as attached to a string of tubing e extending to the surface, and by which the tool is lowered and raised within well casing f. The casing f, as shown in Figure 2, has an inner liner g attached thereto by an overlapping joint, the liner being suspended at the joint by liner hanger h. The upper portion of the squeeze tool consists of a container or pump cylinder 12, providing a chamber therewithin which is charged with the sealing material. Piston 13 for ejecting the material from cylinder 12 is of the plunger cup type and is mounted on a hollow piston rod 14 which has a slidable bearing in the upper end of cylinder 12 and attaches to tubing string e by a coupling 15. A series of ports 16 in the upper end of piston rod 14 admit well fluid to the interior of the same where downward movement of fluid is permitted by a check valve 17. At its lower end but in spaced relation to piston 13, rod 14 has fixedly attached thereto a male nut 18 having a coarse right hand thread on its exterior which screws into a threaded socket 19 therefor at the top of container 12 to secure the piston 13 in retracted position. Below the nut 18, piston rod 14 has additional ports 20 communicating with its interior where downward movement of fluid is permitted by another check valve 21. Small ports 22 in the pump cylinder communicate with its interior below the retracted piston 13.

At its lower end the container or pump cylinder 12 is secured to a down drive spear 25 having downwardly and inwardly inclined slipways to which slips 26 are slidably attached in a known manner. Between the slipways there are suitably mounted as by screws 28 (Figure 1c) three reset springs 29, each spring having a low rounded stop projection or a 45° tapered ridge 30 across the width of the spring 29. Stops 30 are arranged to abut against a similarly rounded or tapered upper edge of slip setting sleeve 31 which has cut out pockets 32 for slips 26. These springs 29 function as reset means for yieldingly latching sleeve 31 and slips 26 in unset position when desired. A floating shear pin ring 33 abuts the lower end of spear 25 and is provided with openings for shear pins 34 which extend through holes in slip setting sleeve 31 and are held in place by suitable means, such as a circumferential wire lock (not shown). Shear pins 34 lock spear 25 and sleeve 31 against relative movement with slips 26 in retracted or non-set position.

Spear 25 has secured thereto a tubular by-pass mandrel 36 closed at its upper end by a wall 37 which surrounds the open end of a tube 38, secured within the mandrel 36 and connecting with the central bore or passage through spear 25. The lower end of tube 38 is closed but it has a lateral port 39 in registry with a lateral opening of the same size in mandrel 36, the tube being welded to the mandrel around the port and opening. Mandrel 36 is provided with a by-pass opening 40 which is at all times in unrestricted flow connection with one or more ports 41 in sleeve 31. Sleeve 31 has an extension 42 to provide a pressure packing gland at 43 bearing against the mandrel 36, the extension having an outer mandrel 44 projecting downwardly therefrom in annularly spaced relation to the upper mandrel 36. The mandrel 44 supports a downwardly facing rubber cup packer 45 fitting the well casing f above ports 47 provided in the mandrel 44 between the packer 45 and a liner stop 46. The inner mandrel 36 is provided with a fixedly attached close fitting sealing ring 50 just above port 39, also with close fitting sealing rings 51 just below port 39, these rings bearing against the inner surface of the outer mandrel 44. Mandrel 36 extends beyond liner stop 46 on mandrel 44 and carries at its extremity an open ended guide 52 and somewhat thereabove an upwardly facing cup packer 53.

To prepare the above tool for use in sealing a liner hanger joint, the pump cylinder 12 is filled with the sealing material, nut 18 on the piston rod 14 is threaded hand-tight into the socket 19 to lock the piston 13 in "up" or retracted position, and the assembled tool with shear pins 34 in place is lowered by means of the tubing string e into the well. As the tool approaches the setting point, guide 52 at the end of the mandrel 36 is directed into the liner G followed by the upwardly facing cup packer 53, downward movement of the tubing string continuing until liner stop 46 on the outer mandrel 44 seats on the liner hanger h. Since the mandrel 36 is open at its lower end there has been free by-passing of fluid up through the mandrel, past the packers 53 and 45, around and along the exterior of tube 38 and out through ports 40 and 41 into the annulus between the tool and well casing f. With the squeeze tool in place on the liner hanger h, slip setting sleeve 31 is held in static position by shear pins 34. Further lowering of the tubing string shears pins 34, whereupon the spear 25 moves downwardly the required distance to expand slips outwardly into contact with the casing f (Figure 2). The mandrel 36 moves downwardly with spear 25 to bring outlet port 39 of tube 38 (heretofore closed), into register with ports 47 in mandrel 44, the packing rings 51 moving to position below ports 47 to shut off the passage through liner stop 46 and fully isolate the zone between liner stop 46 and packer 45. With the discharge port 39 now open, the sealing material can be forced into the restricted and isolated zone defined by liner stop 46 and packer 45. The tubing string e is raised slightly to hang in natural tension and then it is rotated to the right, causing nut 18 on the piston rod 14 to back out of threaded socket 19. The ports 22 relieve pressure resultant from the movement of the piston 13 while the nut 18 is removed from its socket. Complete removal of the nut 18 lowers the piston 13 sufficiently to render these ports non-communicative with the interior of the cylinder 12 below the piston 13 (see Figure 2). With the piston 13 free, the tubing string e is lowered, forcing the sealing material under any desired pressure out of container 12 through the center hole in the spear 25, through the tube 38, and out of ports 39 and 47. Since the space between the lower cup packer 53 and the liner stop 46 is full of dead fluid, the sealing material is confined in the area between the liner stop and upper cup packer 45. It will be noted that packing gland 43 seals against any leakage along the mandrel 36 and backs up clearance ring 50 whose function is to keep the sealing material out of the clearance space between mandrels 36 and 44. Likewise, sealing rings 51 now being below ports 47 keep the sealing material from getting between mandrels 36 and 44 below ports 47.

In this position, mechanical location and anchoring of the squeeze tool are accomplished by hydraulic pressure on confined surfaces as follows: tubing weight applied through piston rod 14 generates pressure on the contents of the container 12 which in turn is exerted upon the unbalanced area of the spear 25, forcing it down. This pressure applied by the sealing material forced onto the isolated zone of the well is exerted on the exposed area of the lower cup packer 53 which is directly connected to the spear 25 and also tends to force it down. In opposition to this downward holding of the spear body there is exerted the same pressure per square inch upwardly against the exposed lower area of the upper cup packer 45 which is directly connected to the slips 26.

The utilization of the generated hydraulic pressure positively to hold the tool in place is an important factor in its successful use. Also, the structural arrangement whereby the slip setting travel of the spear causes the telescoped portions of the mandrels 36 and 44 to function as a sleeve valve to open the discharge port 39 of the tube 38 prevents any discharge of sealing material, accidental or otherwise, until after pins 34 are sheared and the slips moved to set position.

On completion of the travel of the piston 13 in the chamber 12, all of the sealing material is discharged at the desired point with the exception of that left in the tool. After a predetermined interval of a few minutes to permit the sealing material to penetrate and to pack into place, the tubing string e is raised slowly to move the tool away from the working surfaces without creating turbulence of suction, which might disturb or dislodge material from sealed areas. As the slips release and the tool moves upwardly, the stops or ridges 30 on springs 29 automatically engage the upper edge of the sleeve 31, securing the slips 26 in retracted or unset position. The tool is raised well above the liner hanger h, whereupon an accelerated downward movement of the tubing string *e* will cause the spear 25 to move downwardly at a much greater rate than sleeve 31 which accordingly depresses the springs 29 and passes over the stops 30 to reset slips 26 against the well casing. By reciprocating piston 13 in the container 12 by means of the tubing string, well fluid will be pumped through the tool to purge it of all sealing material, which falls away in the form of fluffy droplets. These solidfy into discrete particles by the time they reach the bottom of the well and can be removed by bailing. After the sealing material has set, the effectiveness of the seal can be tested by again lowering the squeeze tool to working position (Figure 2) and noting whether pressure applied to reciprocating piston 13 in container 12, which is now filled with well fluid, indicates that the hanger joint has been effectively sealed. This testing operation without coming out of the well to replace shear pins 34 is effected by use of the reset springs 29 which by their construction effect a limited and controlled means of releasably holding the slips 26 in unset position during lowering of the tool, whereby the complete operation of sealing the leak, removing and purging the tool of excess sealing material, and then going back to test the effectiveness of the seal is accomplished in one round trip of the tubing string.

For sealing leaks in sections of the well casing or tubing, a modification of the above described squeeze tool is utilized but certain parts remain the same and are designated by the same reference characters. Referring now to Figures 5a, 5b, 5c, 5d, and 6a, 6b, and 6c, it will be noted that the sealing material is to be charged into a container or pump cylinder 12 to be discharged therefrom by the piston 13 on the hollow piston rod 14 attached to the tubing string *e*, as in the first apparatus form of the invention. Interposed between the container 12 and the spear and slip assembly is an auxiliary or test pump mechanism (Figures 5b, 6a and 6b) comprising a hollow connecting member 55 provided with a check valve 56 permitting movement of fluid in a downward direction only, member 55 having a hollow piston or plunger rod 57, which extends within the pump cylinder 60 where it is provided with a packed piston 59. A spline 61 (Figure 10) on rod 57 cooperates with a vertical slot 62 in the bearing end of cylinder 60 to lock these parts against independent rotation. A spring loaded well fluid inlet or check valve 63 is provided in the forward or lower end of the cylinder 60 near its attachment to the spear body 125, the slips 26 being slidably attached in a known manner to spear 125 to serve as the anchoring means for the tool. A slip setting sleeve 131 having pockets 132 for slips 26 is mounted on spear 125 and is latched in position to hold slips 26 out of setting position by the provision of one or more spring pressed latch members 65 (Figures 5c, 6b and 7), each latch member having a pin 66 extending through a hole in the sleeve 131 to engage a socket 67 in the lower portion of spear 125. Each latch member 65 has a tapered lower end 68 to be engaged by the complementary tapered upper end 69 (see Fig. 7) of an outer sleeve or spring carrier 70 mounted on the sleeve 131 for rotary as well as limited axial movement relative thereto, the vertical travel of the sleeve 70 controlling the setting or locking up of the slips 26. The pins 66 on latch members 65 are adapted to engage the sockets 67 in spear 125 to hold the sleeve 131 and slips 26 out of setting position (Figure 5c), but movement of the sleeve 70 to its uppermost position raises latches 65 (Figures 6b and 7) so that spear 125 can move downwardly relative to sleeve 131 and move slips 26 to casing engaging position.

The sleeve or spring carrier 70 has a series of outwardly bowed or bellied springs 71 in the form of a cage (Figure 9) frictionally to engage the well casing, the ends of the springs being held by upper and lower retaining rings 72. The sleeve 70 has an inwardly projecting pin 73 (Figures 7 and 9), the end of which extends into an endless guide track 75 cut or otherwise formed on the exterior of the sleeve 131, the track having vertical sections from which extend inclined sections providing cam surfaces to impart relative rotary movement to the sleeves 131 and 70 when the squeeze tool is raised and lowered by the tubing string *e*. Springs 71 in frictional engagement with the well casing *f* hold the sleeve or carrier 70 against rotation so that the rotative movement is imparted to the sleeve 131 which is keyed to spear 125 by slips 26 with the result that the entire tubing string is rotated, giving a visual indication of the operation at the surface. Track 75 extends upwardly at two diametrically opposite points to a stop position 75a (Figures 7 and 9), which limits the extreme upward movement of the sleeve 70 to hold latches 65 in withdrawn position, and has two other less elevated stop positions 75b diametrically opposed and at 90° spacing from stop positions 75a. When the pin 73 engages either of the stop positions 75b, sleeve 70 cannot trip the latches 65. The intermediate slanted sections of the track way which pin 73 must follow imparts the rotative movement referred to above and the lower straight sections of the track way which all terminate at the same level, bring the rotative movement to a stop. As indicated in Figure 7, which shows one-half of the track-way, the inclined cam sections overlap the straight sections of the track way so that the rotative movement induced by raising and lowering of the tool and imparted to the sleeve 131 can be in one direction only, namely to the left. Sleeve 131 has by-pass ports 78 and 79 adjacent its ends (Figure 5c) which are open during movement of the tool into the well.

Secured to the spear body 125 is an inner or by-pass mandrel 86, the upper end of which is closed by a wall 87 which surrounds the open end of the tube 88 connecting with the central bore of spear 125. The lower end of the tube 88 is closed, but it has a lateral port 89 in register with a lateral opening of the same size in the mandrel 86, the tube being welded to the mandrel around the port and opening. The mandrel 86 has one or more by-pass ports 90 at its upper end, and other by-pass ports 91 below the end of tube 89.

The sleeve 131 has an extension 92 to provide a pressure packing gland at 93 bearing upon the inner mandrel 86. The extension or outer mandrel 92 supports a downwardly facing rubber packer cup 95 fitting the well casing *f*, has ports 97 beyond the cup packer, and at its lower end provides a pressure packing gland 98 engaging mandrel 86.

Inner mandrel 86 has fixed packing rings 100 and 101 thereon, above and below port 89 respectively. The mandrel 86 extends beyond the outer mandrel 92 and has an extension 106 on which is fixedly mounted an upwardly directed rubber packer cup 107 fitting the well casing *f*. Beyond or below the packer 107 a sleeve valve 108 is slidably mounted on the extension 106, the valve having a series of outwardly bent springs 109 frictionally engaging the well casing and held at their ends by retaining rings 110. At each end of the sleeve valve 108 are packing glands 111. Within the open bore of the inner mandrel extension 106 is a by-pass tube 112 closed at its ends but having lateral ports 113 and 114, in registry with lateral openings in the extension 106, the tube 112 being welded to extension 106 around said ports and openings to secure the tube in place and out of fluid connection with the interior of the extension 106. The port 113 is above the cup packer 107 and remains at all times open. The port 114 is below the cup packer 108 so as to be closed by the sleeve valve 108. The extension 106 has a guide 115 at its lower end and is of such length that sleeve valve 108 can move downwardly and well below the port 114.

Operation of the mechanical squeeze tool shown in Figures 5a–10 is as follows. A trial or dummy run is made with the primary purpose of accurately locating the leak or leaks and for the additional purposes of making sure that the tool is functioning properly and that it can generate enough pressure in the chamber 12 to force sealing material into the leak. It also may be necessary to clean or otherwise condition the leak for the subsequent sealing operation. For the trial run, the container 12 is filled with water or any other desired fluid and the nut 18 is set hand tight in its socket 19 to hold the piston 13 in "up" or retracted position. Since the tool utilizes full size cup packers, ample means to by-pass well fluid must be provided through and around the tool. On lowering the tool, well fluid can pass up through the inner mandrel 86, 106 and be discharged through ports 90, 78, and 79. Fluid trapped between cup packers 95 and 107 is equalized through registering ports 91 and 97. When the tool has been lowered to a point approximating the calculated location of the casing leak, the tool casing slips 26 are set to test the tightness of the well casing in downward stages. To set slips 26 into engagement with the well casing, the tool is raised a short distance (as two feet) which forces the rotary setting sleeve or spring carrier 70 to so position itself laterally with respect to slip setting sleeve 131 by action of the pin 73 in trackway 75 as to allow the sleeve 70 (on the subsequent lowering of the tool) to contact latches 65 and move them to inoperative position, thereby permitting spear 125 to descend relative to the sleeve 131 and expand the slips 26 against the well casing f. (The same sequence of manipulation will return the slips to latched or locked-up position and the rotary setting sleeve or spring carrier 70 to its original position.) This entire slip setting procedure and action is effected and controlled by vertical movement only of the tool. With the slips set, piston 59 in auxiliary or test pump cylinder 60 moves to the bottom of its stroke (about two feet). In the meantime, inner mandrel 86 has moved downwardly to open port 89 by registering it with the ports 97 in the outer mandrel 92 (Figure 6c). By-pass ports 91 in the inner mandrel 86 are sealed off by packing rings 101 which have moved below the ports 97 in the outer mandrel. Since the testing is being effected in a downward direction, the sleeve valve 108 on the inner mandrel extension 106 is in its upper position to close off the lower auxiliary by-pass port 114. As is evident from Figure 5c, the zone or section of the well between packers 95 and 107 is now entirely isolated save for registered ports 89 and 97 which connect with the pump chambers and the zone is ready for test. The tubing string at the surface is now rotated to the right to release the piston 13 in the container 12 by turning nut 18 out of its socket 19. Figures 5a and 6a show the position of these parts before and after release, respectively. The piston 13 thus freed is utilized to push the fluid out of the container 12 through the auxiliary pump 57, 60, and thence through the spear 125 and tube 88 into the isolated zone between packers 95 and 107. Raising and then lowering the tubing string will actuate the pistons of both pumps in sequence.

Assuming that a rupture x (Figure 6c) of the well casing f has been actually located and conditioned by the procedure described in the preceding paragraph, the exact location is noted and recorded on the run-in string of tubing and the tool is released and pulled out of the well. The container 12 is now filled with the plastic sealing material, the piston 13 is again secured in "up" position by nut 18, and the squeeze tool run back into the well as near to the previous location as possible. Since it is desirable to use small quantities of sealing material and the storage space in the container 12 is limited, it is important if not imperative to keep the spacing of the packers 95 and 107 as close as possible so as to hold the isolated zone or section defined by the packers to a minimum. Hence difficulty may be encountered in attempting to again exactly bridge the rupture in the well casing, so in order to be positive that the loaded squeeze tool is correctly located before starting this unloading or sealing operation, the auxiliary or test pump 59, 60 is brought into action after the tool is in place. Inlet check valve 63 enables this pump to take in well fluid on its upstroke and on the downstroke to discharge it through the axial passage in the spear 125 and through tube 88 into the isolated zone between packers 95 and 107. If repeated reciprocations of piston 59 show by absence of pressure build-up that the isolated zone bridges the leak, the tubing string is adjusted to take tension or compression off nut 18 on the piston rod 14. The string is then rotated to the right to release the piston 13, whereupon, on lowering the tubing string, the sealing material is ejected from the container 12, forcing the well fluid in the tool ahead of it under appropriate pressure into the isolated zone to close break or rupture x. Upon the complete discharge of the sealing material from the container 12, the tool is left inactive in discharge condition (Figures 6a, 6b and 6c) for a short time to permit penetration of the break by the sealing material and some solidification of the same. The tool is then released carefully and slowly moved upwardly away from the repair zone to a point where any tool scavenging turbulence will not tend to displace the deposited sealent material.

In the initial upward movement of the tubing string both the piston 13 and the piston 59 are moved to the upward limit of their respective strokes. The spear 125 is then lifted, allowing slips 26 to be retracted and inner mandrel 86 moved upwardly with the spear 125 closing the port 89 and bringing by-pass ports 91 again into fluid communication with ports 97 in outer mandrel 92. At the same time, the extension 106 on the inner mandren 86 slides through the sleeve valve 108 to uncover the auxiliary by-pass port 114, thereby providing through tube 112 a free exit for fluid and waste sealent material trapped between packers 95 and 107. The travel space for sleeve valve 108 on the inner mandrel extension 106 is of sufficient length to leave port 114 open when the tool is reset for cleaning and both pistons 13 and 59 are reciprocated to pump well fluid through the sealent discharge passages into the zone or sections of the well when isolated between packers 95 and 107, and out through port 113, tube 112 and port 114 to wastage in the well below the tool.

After the tool has been properly purged and cleaned it is left in place until sufficient time has elapsed for the sealant to have fully hardened or set in the repaired zone. Then the tool is released, lowered and reset to isolate the identical zone which was previously treated. The tool is then operated as described above to test the zone for leakage and determine the success of the sealing operation.

Since the packers 95 and 107 move apart when the slips on the squeeze tool are expanded to casing gripping position, it will be apparent that fluid pressure applied to the zone of the well which is isolated by the packers during both testing and sealing operations is effective still further to tighten the tool in place, as already described in connection with the first form of squeeze tool. This separating action of the packers, must be taken into account and allowed for when assembling the tool to isolate a well zone of predetermined depth and volume.

Figure 11 shows a modification of the mechanical squeeze tool for sealing the bottom of a well. In general it is quite similar to the squeeze tool of Figures 1 and 2, and the same reference characters are used to indicate like parts. The differences reside in the structure of the lower end of the tool. On this tool the extension 44 attached to the slip setting sleeve 31 and forming the outer mandrel not only carries a downwardly facing rubber cup packer 45 but also has attached thereto a guide sleeve 144 closed at its upper end and forming a chamber 143 entirely enclosing the lower telescoping portions of the inner and outer mandrels 44 and 136 which cooperate as a valve to open and close outlet port 39 for the tube 38. Beyond the end of the mandrel 44 the sleeve 142 tapers to a reduced tubular extension 144 still in spaced enclosing relation to inner mandrel 136 to project beyond the latter. The tubular extension 144 has a series of lateral outlet ports 145 adjacent its lower end which is closed by a guide and stop member 146. Below the sealing rings 51, the inner mandrel 136 has additional by-pass ports 148 and below the latter additional fixed sealing rings 149. When the tool is being run into the well with slips locked in retracted position (by the shear pins extending through the slip setting sleeve 31 into floating ring 33), inner mandrel 136 will be in its upmost position closing outlet port 39, but registering its by-pass ports 148 with ports 47 in outer mandrel 42 to permit free movement of well fluid into and out of the chamber 143 and thence out through the ports 40 and 41 above the packer 45. Figure 11 shows the tool in place with guide stop 146 resting on the bottom of the well (to isolate all of the well below packer 45), pins sheared, and spear 25 in lowered position to set slips 26 and to open port 39 by registering it with ports 47 while closing by-pass ports 148. The nut 18 on the piston rod 14 has been turned out of its socket 19 and the piston 13 is descending to force the sealing material out of the container 12. The material passes through the bore of the spear 25, through the tube 38, out of the discharge port 39 into the chamber 143 and is conducted by the sleeve 142 and its reduced extension 144 to emerge through ports 145 into the bottom of the well. After the piston 13 completes its downward stroke, it is retracted to fill the chamber 12 with well fluid admitted through the hollow piston rod 14. The piston 13 is then lowered again about a half stroke utilizing the admitted well fluid to complete the ejection of the sealing material from the tool. After a suitable interval, the tubing string is lifted to cause the slips to disengage from the casing and the tool is slowly raised so as to create as little disturbance as possible in the discharged mass of sealing material. Purging and cleaning of the tool is effected at a higher level in the well as previously described, before the tool is removed from the well.

Figure 3 illustrates the use of a container for sealing material provided with a free piston to be actuated by fluid pressure from the surface, a simple cylinder 12a being shown attached to the tool of Figure 1 in place of container 12. Such cylinder 12a can also be directly substituted for the container 12 in any of the forms of squeeze tool described herein. A free piston 13a is shown in cylinder 12a, but it may have any known or suitable type of latching means to be released by fluid pressure or other means not requiring rotation of the tubing string e. Hence, when a sealing container with a free piston is attached to the squeeze tool it may be provided with other types of anchoring devices than those shown, including a J-slot spear and slip assembly, etc. In practice any of the tools of the present application when equipped with container 12a and piston 13a, is positioned and set to isolate a leaking zone or section of the well in accordance with the general procedure heretofore described. The piston 13a is then forced downwardly by fluid pressure to eject the sealing material from the container 12a. To permit the subsequent cleaning of the tool, it is now requisite to pass well fluid or other liquid through the tool. One way to accomplish this is by a port, such as 13b, through piston 13a, the port being controlled by a valve tripped at the end of the piston stroke, or by any other suitable or desired means. In the form shown, the piston 13a has a frangible disk 13c over the port 13b, which can be ruptured at any time after the piston has completed its stroke by a go-devil, by increased pressure, etc.

Figure 4 illustrates the use of a cartridge type of container for sealing material which can be dropped or forced down to the squeeze tool shortly before the sealing operation is to be performed. This procedure is desirable when difficulty is experienced in positioning the squeeze tool to isolate the exact zone of leakage, also when the sealing material to be used is compounded to have a particularly fast setting or hardening time. For cartridge loading, the tubing string such as j (Figure 4) is attached directly to the spear 25 of the squeeze tools shown in Figures 1–3 and 11, or to connecting member 55 of the squeeze tool shown in Figures 5a–6c. The cartridge illustrated in Figure 4 comprises a cylinder 152 of a size to loosely fit the interior of the tubing string j. The lower end of cylinder 152 is closed by a thin disk or plate 153 of frangible material and a free piston 154 closely fitting the bore of the cylinder 152 is positioned above the sealing material with which the cylinder is filled. The cylinder 152 may be provided at its upper end with an extension of reduced size on which is fitted an upwardly facing cup member 155 of rubber or other resilient material to enable the cartridge to be forced downwardly by fluid pressure if it does not fall by gravity. The piston 154, like the piston 13a of Figure 3, has a bore 156 therethrough closed by a frangible disk 157 of greater strength than disk 153 which closes the lower end of the cylinder. In practice, the cylinder 152 loaded with fast setting sealing material is dropped or forced down to the tool when the latter is set and ready for the sealing operation. Fluid pressure is applied through the tubing string j to piston 154 sufficient to rupture disk 153 at the bottom of cylinder 152 but not sufficient to rupture disk 157 on piston 154. After the sealing material has been ejected from the cylinder 152 and piston 154 is at the end of its stroke, the pressure in the tubing string j is increased to rupture the disk 157. The tool can then be flushed and cleaned on removal from the repair zone.

From the above it will be apparent that leaks in well casing can be efficiently sealed by the process of the present invention, utilizing thermo-setting plastic compounds which have been made thick, viscous and coherent by incorporating therein a suitable filler such as commercial flour. The mix, having the consistency of thick bread dough or molding clay is handrolled into short cylinders which are individually dropped into the container of the squeeze tool whether it be 12, 12a or 152. The sealing material will not flow or migrate, and a mix having a setting or hardening time of 1½ to 2 hours at well temperatures of the order of 140° is suitable for most operations. If a longer time is required an iced container may be utilized to delay the setting, or a cartridge such as shown in Figure 4 will deliver the sealing compound when needed. The material is easily ejected from its container but is viscous and coherent enough to stay in place and is not affected by gas, oil, water, cement, acids, etc., in the well. It is heavy, but will not migrate under its own weight. An important feature of this invention is the use of small amounts so as not to endanger shutting off or impairing production of the well. As little as two gallons of the sealing material can be effectively used and most jobs require less than eight gallons. Excess material is removed from the repair area and the flushing and cleansing operation on the tool which quickly follows before the material hardens reduces the excess material to fluffy droplets, which harden as discrete particles by the time they reach the bottom of the well and can be removed without difficulty. Pressures utilized in ejecting the sealing material vary somewhat with the nature and extent of the rupture or leak and are usually in the range of 250 to 1000 pounds per square inch. The quantity of filler (commercial flour or the like) used will depend upon the nature and proportions of the liquids making up chosen basic phenol condensation product, but is usually from 60 to 80% of the total. Too much filler is to be avoided as the resulting product becomes too brittle, loses its tensile strength and does not set properly. The squeeze tools herein shown and described have been developed with the primary purpose of carrying out the steps of the sealing process with the improved semi-solid plastic sealing materials. However, they utilize containers for sealent which are completely closed off from all contact with well fluids and are valve controlled up to the actual sealing operation. Hence they may be utilized to advantage with other types and kinds of ejectable materials whether sealent or not.

While the invention has been herein disclosed in both its process and apparatus aspects in what is now considered to be preferred forms, it is to be understood that the invention is not limited to the specific details thereof, but covers all changes, adaptations, and modifications within the scope of the appended claims.

We claim:

1. Apparatus for sealing leaks or openings in the walls and joints of the casings of oil wells and the like with thick, viscous, non-migrant, semi-solid, plastic material which comprises a container for a charge of the plastic material, a piston for ejecting the material from said container, means slidably attached to said container carrying casing engaging means for releasably engaging the well casing a pair of spaced packers engaging the well casing, means connected with said container supporting said packers with one packer being mounted on said slidable means and said slidable means being movable relative to the other packer, and means actuated by the setting of said casing engaging means for effecting movement of said movable packer to a fixed position, and means operatively connected with said container operable responsive to said movement of said one packer to said fixed position for establishing communication between said container and the well zone.

2. A squeeze tool for sealing leaks or openings in oil well casings and the like comprising a container for the sealing material, a piston for ejecting the material from the container, a spear and slip assembly slidably attached to said container for releasably engaging the well casing, inner and outer mandrels on said assembly, a packer on each of said mandrels for engaging the well casing for isolating between the packers a restricted zone or section of the well casing, means embodied in said mandrels for by-passing well fluids past said packers during movement of said tool within the well, and means operatively connected with said mandrels actuated by the setting of said assembly for stopping the by-passing of well fluids to and from said isolated zone, and means operatively connected with said container and said mandrels for establishing fluid communication between said zone and said container responsive to said setting of said assembly.

3. A squeeze tool for sealing leaks or openings in oil well casings and the like comprising a container for the sealing material, a piston for ejecting the material from the container, a spear and slip assembly attached to said container for releasably engaging the well casing, inner and outer telescopically related mandrels on said assembly, a packer on each of said mandrels for engaging the well casing for isolating between the packers a restricted zone or section of the well casing, means for by-passing well fluids past said packers during movement of said tool within the well, valve means on the telescoping portions of said mandrels actuated by the relative movement of the mandrels during the setting of said assembly for stopping the by-passing of well fluids to and from said isolated zone, and means connected with said container for establishing communication between said zone and said container responsive to said setting of said assembly.

4. A squeeze tool for sealing leaks or openings in oil well casing and the like comprising a container for the sealing material, a piston for ejecting the material from the container, a spear and slip assembly attached to said container for releasably engaging the well casing, inner and outer telescopically related mandrels on said assembly, a packer on each of said mandrels for engaging the well casing for isolating between the packers a restricted zone or section of the well casing, means provided by said mandrels for by-passing well fluids past said packers during movement of said tool within the well, means on one of said mandrels providing an auxiliary by-pass for the space between said packers, means operatively connected with said mandrels actuated by the setting of said assembly for stopping the by-passing of well fluids to and from said isolated zone, means connected with said container and said mandrels for establishing communication between said zone and said container responsive to said setting of said assembly, and separate means on one of said mandrels having frictional engagement with the well casing for controlling said auxiliary by-pass.

5. A squeeze tool for sealing leaks or openings in oil well casings and the like comprising a container for the sealing material, a piston for ejecting the material from the container, a spear and slip assembly attached to said container for releasably engaging the well casing, inner and outer telescopically related mandrels on said assembly, a packer on each of said mandrels for engaging the well casing for isolating between the packers a restricted zone or section of the well casing, means provided by said mandrels for by-passing well fluids during movement of said tool within the well, means on said mandrels providing an auxiliary by-pass for the space between said packers, means carried by said mandrels actuated by the setting of said assembly for stopping the by-passing of well fluids to and from said isolated zone, means connected with said container and said mandrels for establishing communication between said zone and said container, and a valve on said inner mandrel operable responsive to frictional engagement with the well casing for controlling said auxiliary by-pass.

6. A squeeze tool for sealing leaks or openings as set forth in claim 5 in which the valve controlling said auxiliary by-pass is constructed and arranged to open the latter to permit flushing and cleaning of the tool including the zone between said packers after a sealing operation and when the tool is reset after being moved from the location where the sealing operation took place.

7. A mechanical squeeze tool as set forth in claim 5 in which the valve on the inner mandrel for controlling the auxiliary by-pass is a sleeve valve having spring members frictionally engaging the well casing, said inner mandrel providing sufficient extent of movement of the valve so that upon upward movement of the tool away from a sealing operation the tool can be reset with the auxiliary by-pass open to permit flushing and cleaning of the tool with well fluid including the space between the packers.

8. A squeeze tool for sealing leaks or openings in oil well casings and the like comprising a container for the sealing material, a piston for ejecting the material from said container, a spear and slip assembly attached to said container, including a slip setting sleeve, means for yieldably holding said sleeve out of slip setting position, an inner mandrel attached to said spear providing a by-pass for well fluids, said inner mandrel being closed at its upper end but having within its bore a tube in communication with an axial bore in said spear, the other end of said tube opening through a lateral port in said inner mandrel, an outer mandrel attached to said sleeve and in telescoping engagement with said inner mandrel, a packer on said outer mandrel, a packer on said inner mandrel in spaced relation to said first mentioned packer to block off and isolate a zone or section of the well casing, the setting of said spear and slip assembly moving said packers apart, and means on the telescoped portions of said mandrels for establishing communication of said lateral port with the zone between said packers on setting of said spear and slip assembly to enable the sealing material to be forced into said zone.

9. A mechanical squeeze tool to be attached to a tubing string for sealing leaks or openings in oil well casings and the like comprising, a container for the sealing material, a piston in said container for ejecting the material therefrom, means for releasably securing said piston in retracted position operable to release the piston on rotation of the tubing string, a spear and slip assembly attached to said container for engaging the well casing, inner and outer telescopically related mandrels connected with said assembly and said container, packers supported by said mandrels for isolating a small section or zone of the well casing, and means embodied in said mandrels and connected with said container for communicating said zone with said container only when said spear and slip assembly are in set position.

10. A mechanical squeeze tool to be attached to a tubing string for sealing leaks or openings in oil well casings and the like comprising a container for the sealing material, a piston in said container for ejecting the material therefrom, a spear and slip assembly attached to said container for releasably engaging the well casing, packers connected to said spear and slip assembly for isolating a small section or zone of the well casing, an auxiliary pump connected with said container and said tubing string and actuated by reciprocating the tubing string, means providing a valved inlet communicating said pump with the space in the well exteriorly of said pump and means connecting to said auxiliary pump and to said container respectively, for communicating said pump and said container with said zone when the slips of said spear and slip assembly are in set position.

11. In a mechanical squeeze tool for sealing leaks or openings in the casings of oil wells and the like, a container for the sealing material, a piston in said container for ejecting the material therefrom, a spear and slip assembly attached to said container, comprising a slip setting sleeve, means for latching said slips to said spear out of slip setting positions, an outer sleeve mounted on said slip setting sleeve for limited movement relative thereto, said outer sleeve having means for frictionally engaging the well casing so that vertical movement of the tool will effect relative movement of said sleeves, said outer sleeve releasing said latching means at one limit of its upward movement, interengaging means on said sleeves for controlling sequentially the extent of the upward movement of said outer sleeve, packers supported by said spear and slip assembly for isolating a small zone or section of the well casing, and means communicating said zone with said container only when said spear and slip assembly are in set position.

12. In a mechanical squeeze tool as set forth in claim 11 in which the interengaging means controlling the relative movement and positioning of the said sleeves comprise a pin and slot arrangement, the pin being upon one of said sleeves and the slot on the other of said sleeves and taking the form of a closed, generally circular trackway, said trackway having vertical sections of differing extent connected by inclined sections providing cam surfaces to impart relative rotation, the inclined sections overlapping the vertical sections to impart rotation in one direction only and to alternate permissive vertical movement to latch releasing and to inoperative positions.

13. In a mechanical squeeze tool as set forth in claim 12 in which the pin is on said outer sleeve and the trackway is recessed into the outer surface of said slip setting sleeve.

14. Apparatus for sealing leaks in oil well casings and the like comprising; a container for the sealing material; a piston operable in said container for ejecting the material from said container; means connected with said container for releasably engaging the well casing; means connected with said container for isolating a zone of the well including a packer engageable with the casing; and means operatively connected with said container and said casing engaging means including a valve movable axially of said container responsive to the setting of said casing engaging means, for establishing communication between said container and said zone.

15. Apparatus for sealing leaks in oil well casings and the like comprising; a container for the sealing material; a piston for ejecting the material from said container; means connected with said container for releasably engaging the well casing; said last mentioned means including a slip expander having a passage through which material is discharged from said container; means connected with said container for isolating a zone of the well; and means for establishing communication between said passage and said zone.

16. Apparatus for sealing leaks in oil well casings and the like comprising; a container for the sealing material; a piston for ejecting the material from said container; means connected with said container for releasably engaging the well casing; said last mentioned means including a slip expander having a passage through which material is discharged from said container; means connected with said container for isolating a zone of the well; and means for establishing communication between said passage and said zone, including a valve movable axially of said container responsive to the setting of said casing engaging means.

17. A squeeze tool for sealing liner lap leaks in the casing of an oil well, comprising: a container for the sealing material; a piston operable in said container for ejecting the material therefrom; a spear attached to said container; a sleeve slidable on said spear; slips carried by said sleeve and engaged with said spear for movement into casing gripping position responsive to relative axial movement between said spear and said sleeve; means including shear pins for holding said sleeve and said spear against said relative movement; an inner mandrel attached to said spear; an outer mandrel attached to said sleeve and surrounding said inner mandrel; a packer on said outer mandrel for engaging the wall of the casing; a liner stop on said outer mandrel in spaced relation to said packer; said inner mandrel having a portion extending beyond said outer mandrel; a packer on said extended portion for engaging the wall of the liner; and means including ports associated with said mandrels for conducting said sealing material from said container into the zone outside said outer mandrel between said liner stop and the packer on the outer mandrel, responsive to predetermined axial movement of said spear and inner mandrel relative to said sleeve and outer mandrel following the shearing of said pins.

18. A squeeze tool for sealing liner lap leaks in the casing of an oil well, comprising: a container for the sealing material; a piston operable in said container for ejecting the material therefrom; a spear attached to said container; a sleeve slidable on said spear; slips carried by said sleeve and engaged with said spear for movement into casing gripping position responsive to relative axial movement between said spear and said sleeve; means including shear pins for holding said sleeve and said spear against said relative movement; an inner mandrel attached to said spear; an outer mandrel attached to said sleeve and surrounding said inner mandrel; a packer on said outer mandrel for engaging the wall of the casing; a liner stop on said outer mandrel in spaced relation to said packer; said inner mandrel having a portion extending beyond said outer mandrel; a packer on said extended portion for engaging the wall of the liner; means including ports associated with mandrels for conducting said sealing material from said container into the zone outside said outer mandrel between said liner stop and the packer on the outer mandrel, responsive to axial movement of said spear and inner mandrel relative to said sleeve and outer mandrel following the shearing of said pins; upward movement of said spear after said slips have been moved into casing gripping position, causing said slips to be released from said casing gripping position; and yieldable means on said spear for engaging said sleeve responsive to said upward movement of said spear, for releasably holding said spear and said sleeve against the relative movement which causes said slips to be moved into casing gripping position.

19. Apparatus for sealing leaks in well casings, including: a container for the sealing material; means providing an outlet for said container; a piston operable in said container for ejecting the material through said outlet; packing means connected with said container for engagement with the casing to confine the ejected material to a selected zone in the casing; and means providing a releasable screw threaded connection between said container and said piston for holding said piston against movement to expel the material.

20. Apparatus for sealing leaks in well casings with a thick, viscous, coherent, non-migrant, plastic material, including: a container for the sealing material; means providing an outlet for said container; a piston operable in said container for ejecting the material through said outlet; sealing means connected with said container for engagement with the casing to confine the ejected material to a selected zone in the casing; means on said piston and container respectively, coengageable for initially releasably holding said piston in upper position in said container against relative axial movement releasable to permit movement of said piston to eject said material in the well.

21. Apparatus for sealing leaks in well casings with a thick, viscous, coherent, non-migrant, plastic material, including: a container for the sealing material; means providing an outlet for said container; a piston operable in said container for ejecting the material through said outlet; packing means connected with said container for engagement with the casing to confine the ejected material to a selected zone in the casing; means on said piston and said container coengageable upon movement of said piston relative to said container to releasably hold said piston against movement and means connected with said container operable to releasably grip the casing.

22. Apparatus for sealing leaks in well casings, including: a container for the sealing material; means providing an outlet for said container; a piston operable in said container for ejecting the material through said outlet; packing means connected with said container for engagement with the casing above said outlet to confine the ejected material to a selected zone in the casing; and valve means connected with said container operable to permit ejection of said material through said outlet into said zone.

References Cited in the file of this patent

UNITED STATES PATENTS

| 1,828,100 | Crowell | Oct. 20, 1931 |
| 2,016,919 | Church | Oct. 8, 1935 |
| 2,064,336 | Bates | Dec. 15, 1936 |
| 2,134,320 | Taylor | Oct. 25, 1938 |
| 2,221,204 | Santiago | Nov. 12, 1940 |
| 2,274,940 | Stoddard | Mar. 3, 1942 |
| 2,387,002 | Bannister | Oct. 16, 1945 |
| 2,431,751 | Hayward | Dec. 2, 1947 |
| 2,575,603 | Taylor et al. | Nov. 20, 1951 |